United States Patent
Pani et al.

(10) Patent No.: US 12,250,710 B2
(45) Date of Patent: *Mar. 11, 2025

(54) DETERMINING AND SENDING CHANNEL QUALITY INDICATORS (CQIS) FOR DIFFERENT CELLS

(71) Applicant: InterDigital Technology Corporation, Wilmington, DE (US)

(72) Inventors: Diana Pani, Montreal (CA); Christopher R. Cave, Dollard-des-Ormeaux (CA); Paul Marinier, Brossard (CA)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/626,143

(22) Filed: Apr. 3, 2024

(65) Prior Publication Data
US 2024/0251433 A1   Jul. 25, 2024

Related U.S. Application Data

(63) Continuation of application No. 17/903,761, filed on Sep. 6, 2022, now Pat. No. 11,974,316, which is a
(Continued)

(51) Int. Cl.
*H04W 72/04* (2023.01)
*H04B 7/06* (2006.01)
(Continued)

(52) U.S. Cl.
CPC ........ *H04W 72/542* (2023.01); *H04B 7/0632* (2013.01); *H04W 24/10* (2013.01);
(Continued)

(58) Field of Classification Search
None
See application file for complete search history.

(56) References Cited

U.S. PATENT DOCUMENTS 7,149,523 B2   12/2006   Schmidt et al.
7,251,228 B2   7/2007   Knisely et al.
(Continued)

FOREIGN PATENT DOCUMENTS

EP   1343347   9/2003
EP   1615460   1/2006
(Continued)

OTHER PUBLICATIONS

3rd Generation Partnership Project; Technical Specification Group Radio Access Network; Multiplexing and channel coding (FDD) (Release 1999), 3GPP TS 25.212 V3.11.0 (Sep. 2002).
(Continued)

*Primary Examiner* — Kodzovi Acolatse
(74) *Attorney, Agent, or Firm* — Volpe Koenig

(57) ABSTRACT

A wireless transmit/receive unit (WTRU) may periodically transmit control information in slots. The control information may include channel quality indicators (CQIs) for a plurality of cells. In response to expiration of a timer for a first cell of the plurality of cells or in response to a received layer 2 (L2) message associated with the first cell, the transmission of the control information including the CQIs may be ceased for the first cell and the periodic transmission of the control information may continue for a second cell of the plurality of cells.

20 Claims, 3 Drawing Sheets

Related U.S. Application Data continuation of application No. 16/048,928, filed on Jul. 30, 2018, now Pat. No. 11,438,906, which is a continuation of application No. 15/265,040, filed on Sep. 14, 2016, now Pat. No. 10,039,118, which is a continuation of application No. 11/931,459, filed on Oct. 31, 2007, now Pat. No. 9,462,517.

(60) Provisional application No. 60/855,814, filed on Oct. 31, 2006.

(51) Int. Cl.
  H04W 24/10 (2009.01)
  H04W 36/00 (2009.01)
  H04W 72/23 (2023.01)
  H04W 72/542 (2023.01)
  H04L 12/54 (2022.01)
  H04W 36/18 (2009.01)
  H04W 36/30 (2009.01)

(52) U.S. Cl.
  CPC . H04W 36/0083 (2013.01); H04W 36/00837 (2018.08); H04W 72/04 (2013.01); H04W 72/23 (2023.01); H04L 12/56 (2013.01); H04W 36/0058 (2018.08); H04W 36/0085 (2018.08); H04W 36/0088 (2013.01); H04W 36/18 (2013.01); H04W 36/302 (2023.05)

(56) References Cited

U.S. PATENT DOCUMENTS

| | | | |
|---|---|---|---|
| 7,319,718 B2 | 1/2008 | Roh et al. | |
| 7,502,597 B2 | 3/2009 | Murata et al. | |
| 7,616,677 B2 | 11/2009 | Koo et al. | |
| 2002/0141367 A1 | 10/2002 | Hwang et al. | |
| 2003/0100268 A1 | 5/2003 | Moulsley et al. | |
| 2003/0185159 A1 | 10/2003 | Seo et al. | |
| 2003/0185242 A1 | 10/2003 | Lee et al. | |
| 2003/0210668 A1 | 11/2003 | Malladi et al. | |
| 2003/0220119 A1 | 11/2003 | Terry | |
| 2004/0022213 A1 | 2/2004 | Choi et al. | |
| 2004/0116110 A1 | 6/2004 | Amerga et al. | |
| 2004/0179493 A1* | 9/2004 | Khan | H04W 52/262 455/24 |
| 2005/0064872 A1 | 3/2005 | Osseiran et al. | |
| 2005/0068917 A1 | 3/2005 | Sayeedi | |
| 2005/0128993 A1* | 6/2005 | Yu | H04B 7/0691 370/342 |
| 2005/0174669 A1 | 8/2005 | Contreras et al. | |
| 2005/0213575 A1 | 9/2005 | Shin et al. | |
| 2005/0239471 A1 | 10/2005 | Babovic | |
| 2005/0250498 A1* | 11/2005 | Lim | H04W 36/26 455/436 |
| 2005/0251648 A1 | 11/2005 | Yamazaki | |
| 2005/0271014 A1 | 12/2005 | Gillies et al. | |
| 2006/0007889 A1* | 1/2006 | Khan | H04W 36/18 370/331 |
| 2006/0135162 A1* | 6/2006 | Julian | H04W 36/06 455/439 |
| 2006/0154671 A1 | 7/2006 | Kang et al. | |
| 2006/0209870 A1 | 9/2006 | Lee et al. | |
| 2006/0217142 A1 | 9/2006 | Inaba | |
| 2006/0240831 A1 | 10/2006 | Toskala et al. | |
| 2006/0240832 A1 | 10/2006 | Kim et al. | |
| 2006/0240859 A1 | 10/2006 | Gervais et al. | |
| 2006/0268788 A1 | 11/2006 | Harris et al. | |
| 2006/0274712 A1 | 12/2006 | Malladi et al. | |
| 2006/0287743 A1 | 12/2006 | Sampath et al. | |
| 2006/0293008 A1 | 12/2006 | Hiraki et al. | |
| 2007/0026808 A1 | 2/2007 | Love et al. | |
| 2007/0030828 A1 | 2/2007 | Vimpari et al. | |
| 2007/0049308 A1 | 3/2007 | Lindoff et al. | |
| 2007/0049311 A1 | 3/2007 | Lindoff et al. | |
| 2007/0072615 A1 | 3/2007 | Kim et al. | |
| 2007/0076641 A1 | 4/2007 | Bachl et al. | |
| 2007/0091817 A1* | 4/2007 | Yoon | H04L 47/263 370/252 |
| 2007/0097914 A1 | 5/2007 | Grilli et al. | |
| 2007/0115796 A1 | 5/2007 | Jeong et al. | |
| 2007/0133479 A1 | 6/2007 | Montojo et al. | |
| 2007/0184838 A1 | 8/2007 | Van Der Velde et al. | |
| 2007/0189199 A1 | 8/2007 | Nishio | |
| 2007/0254652 A1* | 11/2007 | Khan | H04L 1/0028 455/435.1 |
| 2007/0254658 A1 | 11/2007 | Fabien et al. | |
| 2008/0014942 A1 | 1/2008 | Umesh et al. | |
| 2008/0031368 A1 | 2/2008 | Lindoff et al. | |
| 2008/0081634 A1 | 4/2008 | Kaikkonen et al. | |
| 2008/0081635 A1 | 4/2008 | Jonsson | |
| 2008/0117843 A1 | 5/2008 | Ishii et al. | |
| 2008/0123595 A1 | 5/2008 | Lindheimer et al. | |
| 2008/0123601 A1 | 5/2008 | Malladi et al. | |
| 2008/0144561 A1 | 6/2008 | Kaikkonen et al. | |
| 2008/0192705 A1 | 8/2008 | Suzuki | |
| 2008/0299955 A1 | 12/2008 | Lee et al. | |
| 2009/0093243 A1 | 4/2009 | Lee et al. | |
| 2009/0207771 A1 | 8/2009 | Lindskog et al. | |
| 2010/0330925 A1 | 12/2010 | Catreux-Erceg et al. | |
| 2011/0217936 A1 | 9/2011 | Catreux-Erceg et al. | |
| 2011/0249578 A1 | 10/2011 | Nayeb Nazar et al. | |
| 2013/0301583 A1 | 11/2013 | Lundby | |
| 2013/0308517 A1 | 11/2013 | Lee et al. | |

FOREIGN PATENT DOCUMENTS

| | | |
|---|---|---|
| WO | 2003/059002 | 7/2003 |
| WO | 2004/098221 | 11/2004 |
| WO | 2005/036895 | 4/2005 |
| WO | 2005/079095 | 8/2005 |
| WO | 2006/088301 | 8/2006 |
| WO | 2008/054775 | 8/2008 |

OTHER PUBLICATIONS

3rd Generation Partnership Project; Technical Specification Group Radio Access Network; Multiplexing and channel coding (FDD) (Release 4), 3GPP TS 25.212 V4.6.0 (Sep. 2002).

3rd Generation Partnership Project; Technical Specification Group Radio Access Network; Multiplexing and channel coding (FDD) (Release 5), 3GPP TS 25.212 V5.10.0 (Jun. 2005).

3rd Generation Partnership Project; Technical Specification Group Radio Access Network; Multiplexing and channel coding (FDD) (Release 6), 3GPP TS 25.212 V6.9.0 (Sep. 2006).

3rd Generation Partnership Project; Technical Specification Group Radio Access Network; Multiplexing and channel coding (FDD) (Release 6), 3GPP TS 25.212 V6.10.0 (Dec. 2006).

3rd Generation Partnership Project; Technical Specification Group Radio Access Network; Multiplexing and channel coding (FDD) (Release 7), 3GPP TS 25.212 V7.2.0 (Sep. 2006).

3rd Generation Partnership Project; Technical Specification Group Radio Access Network; Multiplexing and channel coding (FDD) (Release 7), 3GPP TS 25.212 V7.6.0 (Sep. 2007).

$3^{rd}$ Generation Partnership Project; Technical Specification Group Radio Access Network; High Speed Downlink Packet Access (HSDPA); Overall description; Stage 2 (Release 7); 3GPP TS 25.308 V7.0.0 (Mar. 2006).

$3^{rd}$ Generation Partnership Project; Technical Specification Group Radio Access Network; High Speed Downlink Packet Access (HSDPA); Overall description; Stage 2 (Release 7); 3GPP TS 25.308 V7.4.0 (Sep. 2007).

$3^{rd}$ Generation Partnership Project; Technical Specification Radio Access Network; Physical layer procedures (FDD) (Release 7); 3GPP TS 25.214 V7.2.0 (Sep. 2006).

$3^{rd}$ Generation Partnership Project; Technical Specification Radio Access Network; Physical layer procedures (FDD) (Release 7); 3GPP TS 25.214 V7.6.0 (Sep. 2007).

Definition of "Trigger," available at http://dic.academic.ru/dic.nsf/bse/141066/Триггер.

(56) References Cited

OTHER PUBLICATIONS

Fukui, "Study of Channel Quality Feedback in UMTS HSDPA," IEEE Proceedings on Personal, Indoor and Mobile Radio Communications, vol. 1, pp. 336-340 (Sep. 2003).
IEEE 802.16e-2005, IEEE Standard for Local and metropolitan area networks, Part 16: Air Interface for Fixed and Mobile Broadband Wireless Access Systems, Amendment 2: Physical and Medium Access Control Layers for Combined Fixed and Mobile Operation in Licensed Bands, and Corrigendum 1 (Feb. 28, 2006).
Jeon et al., "An Enhanced Channel-Quality Indication (CQI) Reporting Scheme for HS DPA Systems," IEEE Communication Letters, vol. 9, No. 5, pp. 432-433 (May 2005).
LG Electronics, "L1/L2 signaling for CQI reporting considering multiple streams transmission," 3GPP TSG RAN WG1 #44bis meeting, R1-060920, Athens, Greece (Mar. 27-31, 2006).
Lucent Technologies, "Proposal for supporting Real Time services over HSDPA," 3GPP TSG-RAN1 Meeting #40bis, R1-050324, Beijing, China (Apr. 4-8, 2005).
Mitsubishi Electric et al., "Performance comparison of training schemes for uplink transmit antenna selection," 3GPP RAN1#46bis, R1-062942, Seoul, South Korea (Oct. 9-13, 2006).
Qualcomm Europe, "Open issues on details in support of MIMO (FDD) for Rel-7," 3GPP TSG-RAN WG1 #46, R1-062440, Tallin, Estonia (Aug. 28-Sep. 1, 2006).
Third Generation Partnership Project 2, "Medium Access Control (MAC) Standard for cdma2000 Spread Spectrum Systems, Release C," 3GPP2 C.S0003-C, Version 2.0 (Aug. 2004).
Third Generation Partnership Project, "Technical Specification Group Radio Access Network; Evolved Universal Terrestrial Radio Access (E-UTRA); Physical layer procedures (Release 8)," 3GPP TS 36.213 V8.0.0 (Sep. 2007).
Third Generation Partnership Project, "Technical Specification Group Radio Access Network; Evolved Universal Terrestrial Radio Access (E-UTRA) Medium Access Control (MAC) protocol specification (Release 8)," 3GPP TS 36.321 V1.0.0 (Sep. 2007).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.2.0 (Sep. 2007).
Third Generation Partnership Project, "Technical Specification Group Radio Access Network; Evolved Universal Terrestrial Radio Access (E-UTRA); Physical channels and modulation (Release 8)," 3GPP TS 36.211 V8.0.0 (Sep. 2007).
Third Generation Partnership Project, "Technical Specification Group Radio Access Network; Physical layer procedures (FDD) (Release 1999)," 3GPP TS 25.214 V3.12.0 (Mar. 2003).
Third Generation Partnership Project, "Technical Specification Group Radio Access Network; Physical layer procedures (FDD) (Release 4)," 3GPP TS 25.214 V4.6.0 (Mar. 2003).
Third Generation Partnership Project, "Technical Specification Group Radio Access Network; Physical layer procedures (FDD) (Release 5)," 3GPP TS 25.214 V5.11.0 (Jun. 2005).
Third Generation Partnership Project, "Technical Specification Group Radio Access Network; Physical layer procedures (FDD) (Release 6)," 3GPP TS 25.214 V6.10.0 (Sep. 2006).
Third Generation Partnership Project, "Technical Specification Group Radio Access Network; Physical layer procedures (FDD) (Release 6)," 3GPP TS 25.214 V6.11.0 (Dec. 2006).
Third Generation Partnership Project, "Technical Specification Group Radio Access Network; Physical layer procedures (FDD) (Release 7)," 3GPP TS 25.214 V7.2.0 (Sep. 2006).
Third Generation Partnership Project, "Technical Specification Group Radio Access Network; Physical layer procedures (FDD) (Release 7)," 3GPP TS 25.214 V7.6.0 (Sep. 2007).
Third Generation Partnership Project, "Technical Specification Group Radio Access Network; Physical layer procedures (Release 8)," 3GPP TS 36.213 V0.1.0 (Oct. 2006).
Third Generation Partnership Project, "Technical Specification Group Radio Access Network; Physical layer procedures (Release 8)," 3GPP TS 36.213 V1.0.0 (Mar. 2007).
Third Generation Partnership Project, "Technical Specification Group Radio Access Network; Physical Channels and Modulation (Release 8)," 3GPP TS 36.211 V0.1.0 (Oct. 2006).

* cited by examiner

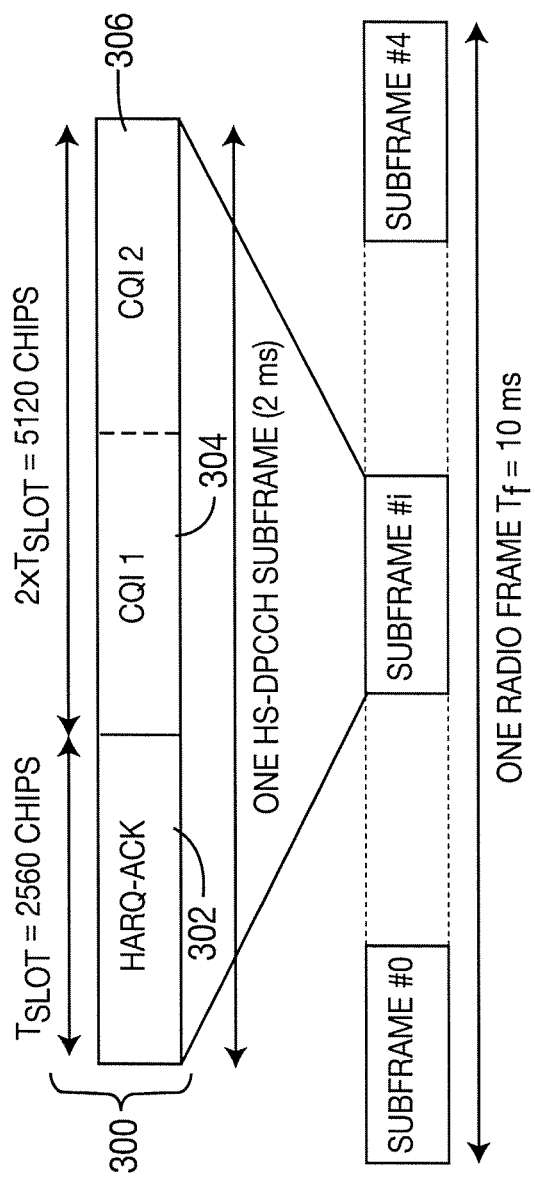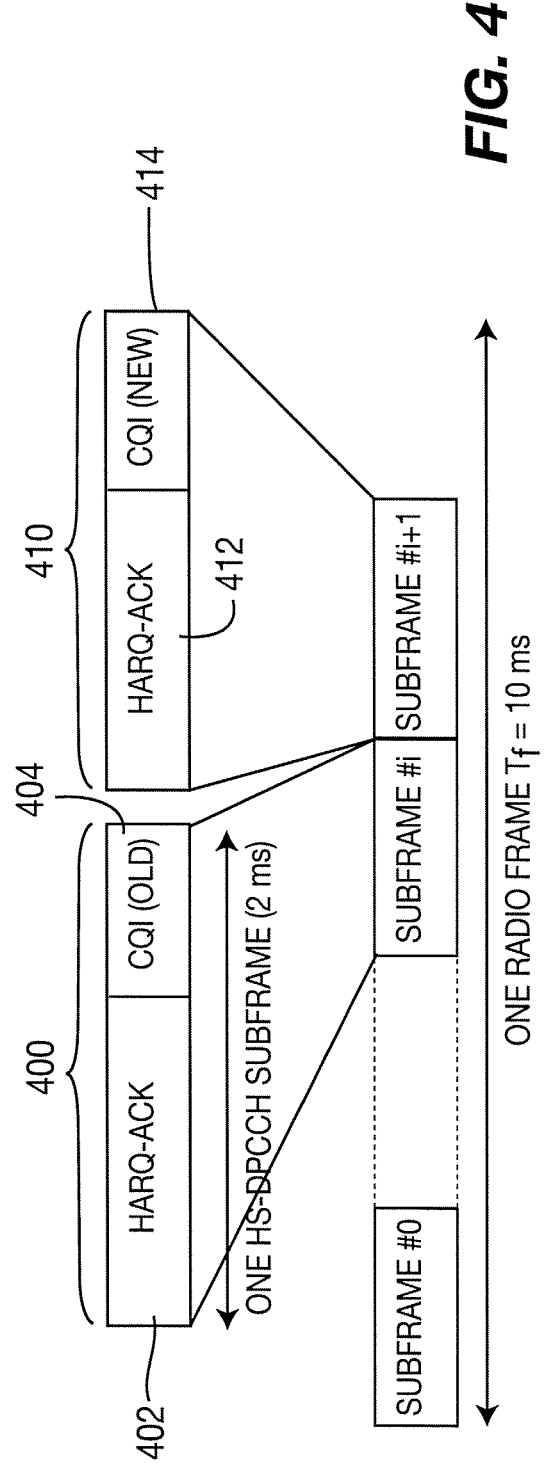

DETERMINING AND SENDING CHANNEL QUALITY INDICATORS (CQIS) FOR DIFFERENT CELLS

CROSS REFERENCE TO RELATED APPLICATION

This application is a continuation of U.S. patent application Ser. No. 17/903,761 file Sep. 6, 2022, which is a continuation of U.S. patent application Ser. No. 16/048,928 filed Jul. 30, 2018, which issued as U.S. Pat. No. 11,438,906 on Sep. 6, 2022, which is a continuation of U.S. patent application Ser. No. 15/265,040, filed Sep. 14, 2016, which issued as U.S. Pat. No. 10,039,118 on Jul. 31, 2018, which is a continuation of U.S. patent application Ser. No. 11/931,459, filed Oct. 31, 2007, which issued as U.S. Pat. No. 9,462,517 on Oct. 4, 2016, which claims the benefit of U.S. Provisional Application No. 60/855,814, filed on Oct. 31, 2006, the contents of which are hereby incorporated by reference herein.

FIELD OF INVENTION

The present invention relates to wireless communications.

BACKGROUND

The 3rd Generation Partnership Project (3GPP) is a collaboration agreement that was established in December 1998. The collaboration agreement brings together a number of telecommunications standards bodies to produce global specifications and technical reports for a $3^{rd}$ Generation mobile communications system. High-speed Downlink Packet Access (HSDPA) is a feature that was introduced in Release 5 of the 3GPP specification. HSDPA achieves maximum spectral efficiency using three concepts: Adaptive Modulation and Coding (AMC), fast physical layer retransmissions (Hybrid ARQ), and fast Node B scheduling.

FIG. 1 is a diagram of a system 100 configured to utilize HSDPA. The system 100 includes a core network 102 and a radio network controller (RNC) 104 that communicates with the core network 102. A plurality of Node Bs 106 communicate with the RNC (for clarity, only two Node Bs are shown in FIG. 1; it is understood that many more Node Bs can be in communication with a single RNC). Each Node B 106 controls a plurality of cells 108 (again, the number of cells 108 shown in FIG. 1 is only exemplary). A wireless transmit/receive unit (WTRU) 110 can communicate with one or more of the cells 108. AMC adapts the transmission data rate on the High Speed Downlink Shared Channel (HS-DSCH) according to the channel conditions perceived by the WTRU. Specifically, a Node B determines the best data rate, coding, and transport block size using the following information obtained from the WTRU on the High Speed Dedicated Physical Control Channel (HS-DPCCH):

1. Channel Quality Indication (CQI), which indicates the channel conditions as monitored by the WTRU, and
2. Acknowledge/negative acknowledge (ACK/NACK) feedback used for fast retransmissions (HARQ).

Handover is the process in which a WTRU switches from one cell to another cell without service interruption. In HSDPA, the high-speed shared channels are monitored by the WTRU in a single cell, which is called the "serving HS-DSCH cell". When a handover occurs, the WTRU needs to switch to a new serving HS-DSCH cell (the target cell/Node B) and stop communication with the old serving HS-DSCH cell (the source cell/Node B). This procedure is also called a serving HS-DSCH cell change.

FIG. 2 shows a flowchart of a method 200 for performing a handover procedure. The WTRU continuously measures the signal strength of neighboring cells (step 202). The WTRU compares the measured signal strength of the neighboring cells with the strength of the signal from the serving cell (step 204). Once the measured signal strength on the monitored common pilot channel (CPICH) of the neighboring cell exceeds the signal strength of the serving cell, the WTRU indicates to the RNC that a cell change is needed (referred to as "a change of best cell"; step 206). The change of best cell is reported from the WTRU to the RNC via an RRC MEASUREMENT REPORT event 1D. This report contains the measured signal strength value and the cell ID. The RNC then makes the final decision whether a serving HS-DSCH cell change is going to occur. The handover is then executed, to switch the WTRU to the new Node B (step 208).

The new serving HS-DSCH cell needs to start downlink transmission to the WTRU at the time the channel configuration takes place (step 210). In order to achieve a maximum transmission rate and maximum spectral efficiency, the Node B needs to adapt to the new channel conditions as fast as possible. The channel quality conditions measured by the WTRU in the new cell are not known by the target Node B, therefore a maximum Modulation Coding Scheme (MCS) cannot be achieved right away. The Node B has to wait to receive a few CQI reports from the WTRU before transmitting at an optimal data rate.

Prior to the CQI reports being transmitted to the Node B, the target Node B may start transmitting at a lower rate than the WTRU can support. This would waste HSDPA resources until the Node B can adapt to the new channel conditions. Keeping in mind that the RNC performed the Node B switch because the downlink channel conditions are better in the new cell, the cell change could be a waste of capacity and resources.

On the other hand, prior to the appropriate number of CQI reports being received by the target Node B, the target Node B may assume that the new channel conditions are better than in the old cell and start transmission at a higher data rate to avoid wasting HSDPA resources. However, the WTRU could be measuring unfavorable channel conditions at the instant after handover, and might have trouble decoding the data over the HS-DSCH. Such trouble would trigger retransmissions and higher error rates until the Node B adapts to the new channel conditions.

Existing 3GPP Release 6 specifications do not provide support for optimal MCS selection and scheduling for the HS-DSCH in the new serving cell after a handover occurs.

SUMMARY

A method implemented in a wireless transmit/receive unit (WTRU) for transmitting a channel quality indication (CQI) report or other measurement report begins by receiving a trigger. A CQI report is transmitted to a handover target Node B until a stop condition is reached. The WTRU will stop transmitting CQI reports to the target Node B if the stop condition is reached. A WTRU configured to perform the method includes an antenna, a transmitter/receiver connected to the antenna, and a processor communicating with the transmitter/receiver, the processor configured to transmit the CQI report to the handover target Node B.

BRIEF DESCRIPTION OF THE DRAWINGS

A more detailed understanding of the invention may be had from the following description, given by way of example and to be understood in conjunction with the accompanying drawings, wherein:

FIG. 3 is a diagram of an HS-DPCCH signal with two embedded CQI reports;

FIG. 4 is a diagram of another HS-DPCCH signal with two embedded CQI reports;

DETAILED DESCRIPTION

Figure 1:
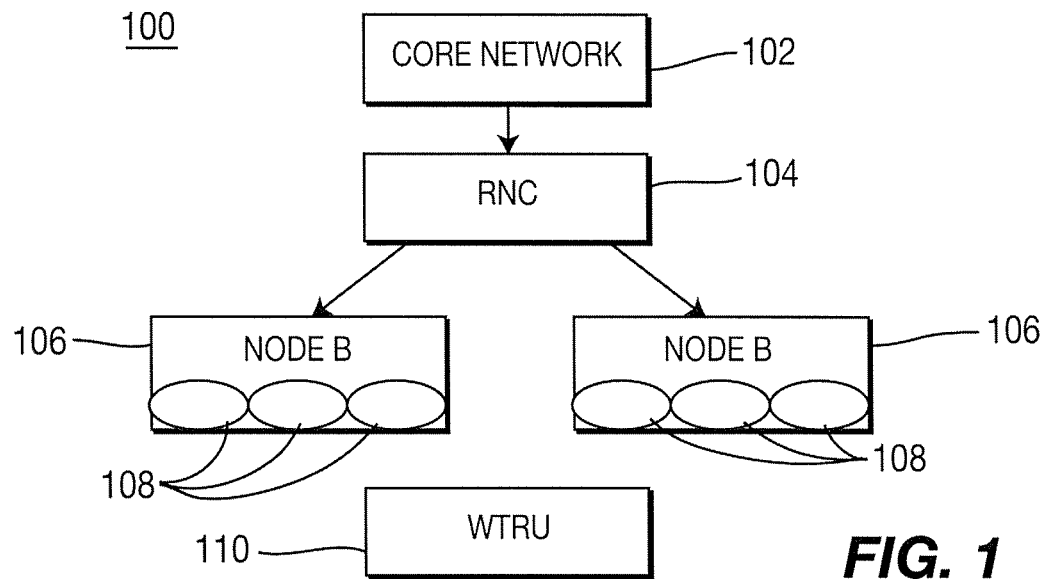
FIG. 1 is a diagram of a system configured to utilize HSDPA.
Figure 2:
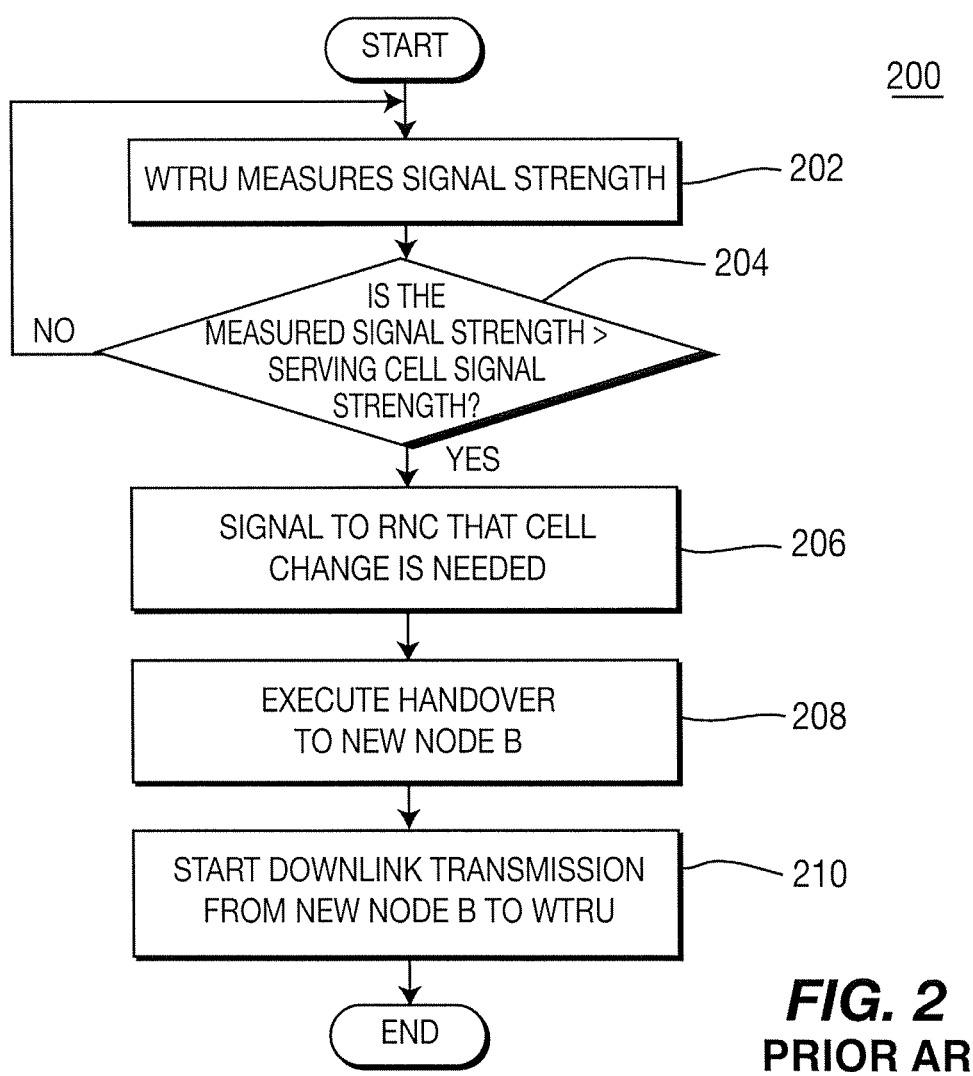
FIG. 2 is a flowchart of a method for performing a handover.

When referred to hereafter, the term "wireless transmit/receive unit (WTRU)" includes, but is not limited to, a user equipment (UE), a mobile station, a fixed or mobile subscriber unit, a pager, a cellular telephone, a personal digital assistant (PDA), a computer, or any other type of user device capable of operating in a wireless environment. When referred to hereafter, the term "base station" includes, but is not limited to, a Node B, a site controller, an access point (AP), or any other type of interfacing device capable of operating in a wireless environment.

The embodiments disclosed herein relate to transmitting data over a new serving Node B after a handover procedure occurs in HSDPA. Specifically, a method is disclosed that provides the target Node B with CQI feedback information required to determine the optimal transmission rate and scheduling for data at the time of cell change (i.e., prior to initiating data transmission to the WTRU over the new HS-DSCH).

Even though the embodiments described herein relate to WCDMA systems, the concepts described are also applicable to other technologies (such as WiMax, etc.) that support mobility and handover. Moreover, the CQI feedback can also refer to other measurement reports used in other technologies.

A first embodiment makes use of the WTRU's existing uplink connection to the Node Bs within its active set. The active set includes all of the established radio links with the WTRU with one or more Node Bs. Should the downlink (DL) serving cell change occur within the active set, the WTRU has an existing communication context with the new Node B in the uplink (UL). In addition, if a serving cell change occurs simultaneously with the Active Set Update, the UL connection to the newly added neighboring Node B can be established prior to the DL serving cell change.

In this embodiment, the WTRU can send CQI reports to both the source Node B and the target Node B over the duration of the handover process. When the handover is complete, the WTRU sends CQI reports only to the new serving HS-DSCH cell.

During the handover procedure, the WTRU monitors a number of parameters from the target Node B to estimate the perceived channel quality. In this embodiment, the WTRU reports the same CQI measurement as currently defined for the serving Node B.

In a second embodiment, measurement on any other downlink reference channel can be used to derive a channel quality metric.

In a third embodiment, during a handover procedure the WTRU uses the same high speed dedicated physical control channel (HS-DPCCH) code to send CQI information to both the source Node B and the target Node B. The CQI report for the target Node B is appended to the CQI information of the source Node B in the HS-DPCCH subframe.

For example, CQI 1 and CQI 2 would correspond to the CQI information of the source Node B and target Node B, respectively. As illustrated in FIG. 3, one HS-DPCCH subframe 300 consists of a HARQ-ACK 302, a CQI 1 (target Node B report) 304, and a CQI 2 (source Node B report) 306. The slot format can be static (e.g., a new slot format is defined and always used) or dynamic where the WTRU can switch the format back and forth during a handover procedure.

Alternatively, the feedback mechanism is based on sending the information on a different HS-DPCCH. When the Node B is added to the active set, it is assigned a new HS-DPCCH code. Therefore, the Node Bs have different HS-DPCCH codes to monitor and the WTRU is aware of the allocated HS-DPCCH codes of all Node Bs within its active set.

For example, codes HS-DPCCH 1 and HS-DPCCH 2 are assigned to source Node B and target node B, respectively. During handover, the WTRU can start sending the CQI information on code HS-DPCCH 2 to the target Node B and continue sending the ACK/NACK and CQI information on code HS-DPCCH 1 to the source Node B. The CQI format within the HS-DPCCH would remain the same.

In a fourth embodiment, the CQI pertaining to a Node B is transmitted every other transmission time interval (TTI) or every other multiple of TTI and the transmissions of CQIs pertaining to different Node Bs are staggered. As shown in FIG. 4, the CQI for the target Node B (CQI(new)) is in a different HS-DPCCH subframe than the CQI for the source Node B (CQI(old)). A first subframe 400 consists of HARQ-ACK 402 and the CQI (old) 404, and a second subframe 410 consists of HARQ-ACK 412 and the CQI (new) 414.

With this method, rules could be established to allow each Node B to determine which sub-frames contain the relevant CQIs. Such rules could be based on the transmission timing of the HS-DPCCH relative to the SFN. Alternatively, no pre-established rule could be defined, and both Node Bs attempt to figure out which of the sub-frames pertain to their own transmissions. Typically, the target Node B could assume that the largest CQI pertains to its transmissions while the source Node B conservatively assumes that the smallest CQI pertains to its transmissions.

Alternatively, as soon as the handover occurs or at a time interval after the measurement report is triggered, the WTRU sends consecutive and frequent CQI reports only to the target Node B. The frequency of the CQI reports is higher than the frequency used during normal operation. The more frequent CQI reports allows the target Node B to quickly adapt to the channel conditions. The frequency of the fast CQI reporting can be configured by higher layers, be predetermined by the WTRU, or be continuously transmitted on consecutive TTIs for a period of time.

In a fifth embodiment, the CQI report could be transmitted by using any other existing or new L1, L2, or L3 signaling mechanism/channel.

In a sixth embodiment, the CQI reports could be mapped to an E-DCH channel.

In a seventh embodiment, the CQI to the target Node B could be reported using RRC signaling, such as the measurement report message sent from the WTRU upon event 1D. The RNC would then forward the CQI measurement to the target Node B upon configuring the radio link to the WTRU.

Figure 5:
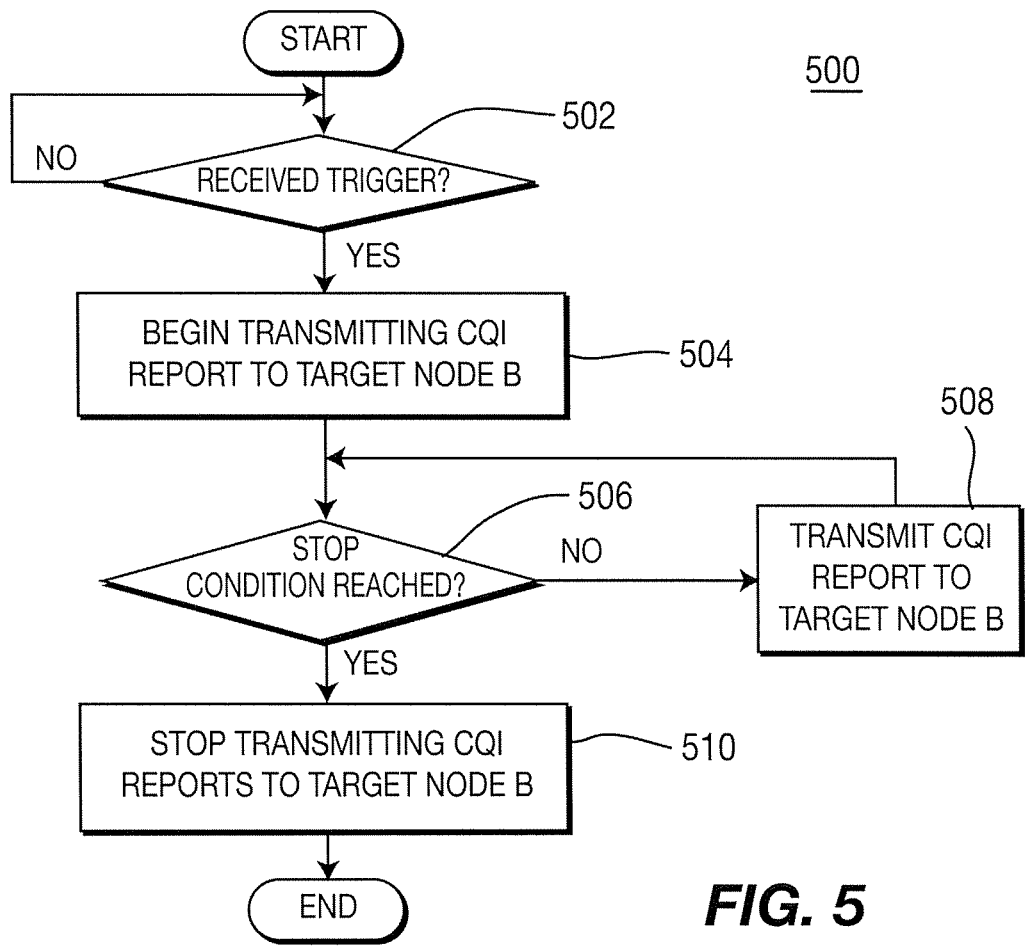
FIG. 5 is a flowchart of a method for transmitting a CQI report to a target Node B.

FIG. 5 is a flowchart of a method 500 for transmitting a CQI report to a target Node B, and is usable in connection with each of the CQI reporting embodiments described above. A determination is made whether the WTRU has received a trigger to begin transmitting CQI reports to the target Node B (step 502). The trigger may be based on one or any combination of the following conditions:

1. As soon as measurement criterion event 1D is fulfilled.
2. At a time interval (Δt) after sending an event 1D measurement report, where Δt is a configurable parameter through higher layer signaling. Example values of Δt are 30 ms and 60 ms.
3. When higher layer signaling (e.g., transport/physical channel or radio bearer reconfiguration) is received by the WTRU indicating a serving cell change.
4. When the WTRU receives an RRC active set update message indicating a serving cell change. The CQI information can be sent as soon as the UL communication to the Node B is available.

Once the WTRU receives the trigger condition, the WTRU can begin transmitting CQI reports to the target Node B (step 504), using any of the embodiments described above. The WTRU can either periodically/continuously transmit the CQI report or transmit the CQI report a preconfigured number of times (e.g., once or twice). In the case of continuous transmission, the periodicity can be configured through higher layer signaling, and a mechanism is needed to stop transmitting the CQI report to the target Node B in case the handover does not take place.

A determination is made whether a stop condition has been reached (step 506). The following mechanisms can be used individually or in combination to determine the stop condition:

1. A timer can be maintained at the WTRU that is started upon triggering any of the conditions described above. The WTRU stops transmission of CQI reports if it does not receive an indication that the handover is occurring or will occur within the configured time.
2. Use the existing handover measurement report mechanism. Currently, the WTRU periodically sends the RRC Measurement Report message to the RNC until the RNC indicates that a handover is occurring or until a preconfigured time. The WTRU stops transmission of CQI reports when the WTRU stops sending measurement reports due to a failed handover.
3. Use existing or new L1, L2, or L3 signaling to indicate to the WTRU to stop transmitting the CQI report to the target Node B.

If the stop condition has not been reached (step 506), then the WTRU continues to transmit CQI reports to the target Node B (step 508). If the stop condition has been reached, then the WTRU stops transmitting CQI reports to the target Node B (step 510) and the method terminates.

The target Node B can start decoding the CQI report from the WTRU if one or a combination of the following conditions occur:

1. As soon as signaling is received from the RNC to reconfigure a serving radio link with this WTRU. The target Node B can use this message as an internal trigger to start decoding the CQI reports.
2. The Node B uses blind detection to determine whether or not a CQI report has been sent.

Figure 6:
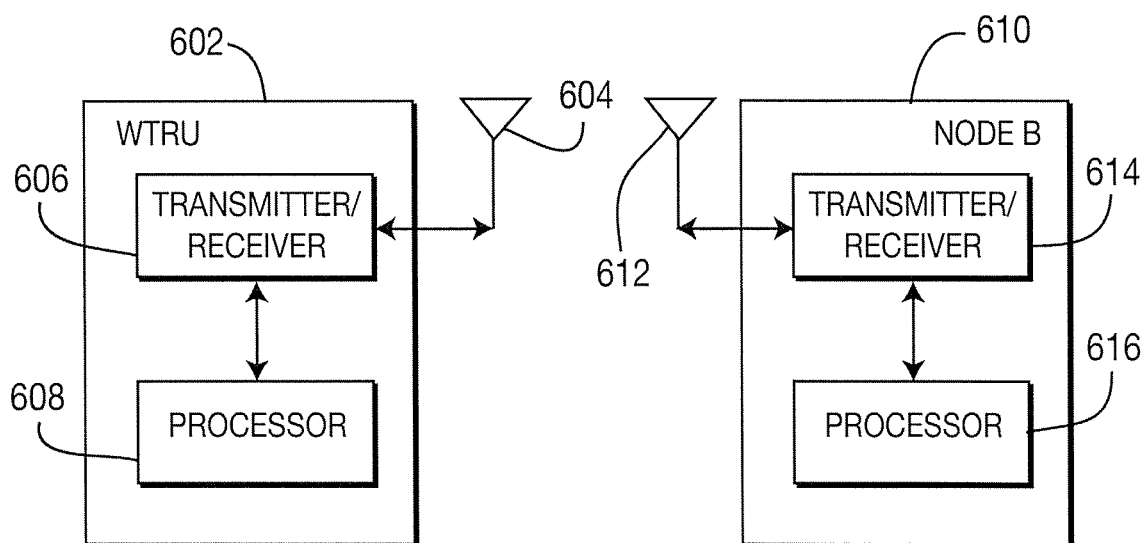
FIG. 6 is a diagram of a WTRU and a Node B configured to transmit and receive CQI reports.

FIG. 6 is a diagram of a WTRU 602 and a Node B 610 configured to transmit and receive CQI reports. The WTRU 602 includes an antenna 604, a transmitter/receiver 606 connected to the antenna 604, and a processor 608 in communication with the transmitter/receiver 606. The processor 608 is configured to implement the method 500 and any of the described embodiments for transmitting a CQI report to the Node B 610.

The Node B 610 includes an antenna 612, a transmitter/receiver 614 connected to the antenna 612, and a processor 616 in communication with the transmitter/receiver 614.

Although the features and elements are described in particular combinations, each feature or element can be used alone without the other features and elements or in various combinations with or without other features and elements. The methods or flow charts provided may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A wireless transmit/receive unit (WTRU) comprising:
a transmitter;
a receiver; and
a processor;
the processor configured to determine a plurality of channel quality indicators (CQIs) using measurements of downlink transmissions;
the processor and the receiver configured to receive at least one radio resource control (RRC) message; and
the processor and the transmitter configured to transmit control information in slots based on the received at least one RRC message;
wherein the control information includes CQIs related to a first cell of the plurality of cells and a second cell of the plurality of cells, wherein CQIs related to the first cell of the plurality of cells are transmitted at a different periodicity than with which CQIs related to the second cell of the plurality of cells are transmitted;
wherein, after expiration of a first configured time period associated with the first cell of the plurality of cells, for a second time period the control information contains CQIs related to the second cell of the plurality of cells and not the first cell of the plurality of cells.

2. The WTRU of claim 1, wherein the processor and the transmitter are further configured to switch between sending additional control information indicating the plurality of CQIs and control information indicating a single CQI.

3. The WTRU of claim 1, wherein the plurality of CQIs are associated with different base stations.

4. The WTRU of claim 1, wherein the second time period begins after the first configured time period expires.

5. The WTRU of claim 1, wherein the second time period begins after a layer 2 (L2) message associated with the first cell of the plurality of cells is received.

6. The WTRU of claim 1, wherein the WTRU is configured to send first acknowledgement/negative acknowledgement (ACK/NACK) information to a first base station associated with the first cell of the plurality of cells and second ACK/NACK information to a second base station associated with the second cell of the plurality of cells.

7. The WTRU of claim 1, wherein the WTRU is configured to measure a first downlink reference channel of a first base station of the first cell and measure a second downlink reference signal of a second base station associated with the second cell of the plurality of cells.

8. The WTRU of claim 1, wherein the WTRU is configured to use a same code for transmission of CQIs related to the first cell and for transmission of CQIs related to the second cell.

9. The WTRU of claim 1, wherein the CQIs are transmitted on slots which are staggered between the first cell and the second cell.

10. The WTRU of claim 1, wherein a first slot offset with which CQIs related to the first cell are transmitted is different than a second slot offset with which CQIs related to the second cell are transmitted.

11. The WTRU of claim 1, wherein CQIs are sent on one of the first cell of the plurality of cells or the second cell of the plurality of cells in response to an additional base station being accessible to the WTRU.

12. The WTRU of claim 1, wherein the WTRU ceases transmission of CQIs related to one of the first cell of the plurality of cells or the second cell of the plurality of cells based on a change of a serving base station.

13. The WTRU of claim 1, wherein the at least one RRC message specifies a CQI transmission periodicity.

14. A method performed by a wireless transmit/receive unit (WTRU), the method comprising:
receiving, by the WTRU, at least one radio resource control (RRC) message;
determining, by the WTRU, a plurality of channel quality indicators (CQIs) using measurements of downlink transmissions; and
transmitting, by the WTRU to a network, control information in slots based on the received at least one RRC message;
wherein the control information includes CQIs related to a first cell of the plurality of cells and a second cell of the plurality of cells, wherein CQIs related to the first cell of the plurality of cells are transmitted at a different periodicity than with which CQIs related to the second cell of the plurality of cells are transmitted; and
wherein, after expiration of a first configured time period associated with the first cell of the plurality of cells expires, for a second time period the control information contains CQIs related to the second cell of the plurality of cells and not the first cell of the plurality of cells.

15. The method of claim 14 further comprising switching, by the WTRU, between sending additional control information indicating the plurality of CQIs and control information indicating a single CQI.

16. The method of claim 14, wherein the plurality of CQIs are associated with different base stations.

17. The method of claim 14, wherein the downlink transmissions are received using a high speed downlink shared channel (HS-DSCH).

18. The method of claim 14, wherein the plurality of cells are High-speed Downlink Packet Access (HSDPA) serving cells.

19. The method of claim 14, wherein the second time period begins after the first configured time period expires.

20. The method of claim 14, wherein the second time period begins after a layer (L2) message associated with the first cell of the plurality of cells is received.

* * * * *

UNITED STATES PATENT AND TRADEMARK OFFICE
CERTIFICATE OF CORRECTION

| | |
|---|---|
| PATENT NO. | : 12,250,710 B2 |
| APPLICATION NO. | : 18/626143 |
| DATED | : March 11, 2025 |
| INVENTOR(S) | : Diana Pani, Christopher R. Cave and Paul Marinier |

Page 1 of 1

It is certified that error appears in the above-identified patent and that said Letters Patent is hereby corrected as shown below:

In the Claims

In Claim 1, at Column 6, Line 58, after the words "a first cell of", delete "the" and insert therefor -- a --.

In Claim 14, at Column 8, Line 14, after the words "a first cell of", delete "the" and insert therefor -- a --.

Signed and Sealed this
Eighth Day of April, 2025

Coke Morgan Stewart
*Acting Director of the United States Patent and Trademark Office*